Feb. 20, 1968   J. P. LAIKAM   3,369,612
CONTROL FOR A POWER ACTUATED TOOL
Filed Feb. 23, 1965

JOHN P. LAIKAM
INVENTOR

Huebner & Worrel
ATTORNEYS though not intended to imply any limitation on the invention.

United States Patent Office 3,369,612
Patented Feb. 20, 1968

3,369,612
CONTROL FOR A POWER ACTUATED TOOL
John P. Laikam, 8692 E. South Ave.,
Fowler, Calif. 93625
Filed Feb. 23, 1965, Ser. No. 434,530
4 Claims. (Cl. 172—5)

ABSTRACT OF THE DISCLOSURE

A control for a power actuated vineyard plow having a support providing a tool arm pivotally mounted on the support for movement between extended and retracted positions relative to a target work area and including a powered member operatively connected to the tool arm and to an actuator member on the support for selective powered movement of the tool arm away from one of said positions under the influence of an external force in opposition to the force applied from said powered member.

---

The invention has specific utility in connection with vineyard plows, such as those exemplified by the type illustrated in my Patent No. 2,386,559, as well as in my presently copending application Ser. No. 258,995, filed Feb. 18, 1963, now Patent No. 3,177,950. The intended function of such vineyard plows is to cultivate the soil immediately adjacent to individual plants in row crops, particularly vineyards.

During such cultivation, it is imperative that some protective measures be taken to prevent injury to individual plants, such as a grapevine, which is growing in a position laterally displaced from the common line of a given row. As disclosed in the aforesaid copending application, the vineyard plow is pivotally mounted for movement between an extended cultivating position and a position retracted from a target work area. The plow is powered by an extensible hydraulic cylinder and piston assembly mounted on a tool bar in a spring-biased linkage.

Such linkage permits movement of the plow from the extended position upon encountering an obstruction in the intended path of movement, however, the spring represents a linearly increasing force resisting retraction of the plow away from the obstruction. Consequently, if the obstruction is sufficiently large or sufficiently displaced from the common line of the row crop, a considerable pressure is exerted by the plow on such an obstruction. Such pressure may exceed a desired value, if the spring is sufficiently strong to insure timely return of the plow upon passing of the obstruction. Therefore, it is highly desirable to provide a force exerting mechanism connected to the plow arm in which a constant force is acting upon the plow arm, regardless of the size and/or position of any obstruction encountered. It is also desired to include a control for such constant force which permits selective adjustment of the maximum force, so as to adapt the plow to varying conditions.

Accordingly, it is an object of the present invention to provide a control for a power actuated tool which limits movement of the tool within a predetermined range by an applied force, while permitting movement of the tool upon encountering an external force of predetermined value having a line of action opposite to the applied force.

Another object is to provide a control for a pressure fluid actuated tool which limits movement of the tool in one direction by an applied force and permits movement of the tool in an opposite direction upon encountering an external force of a predetermined value.

Another object is to provide an improved control for a hydraulically actuated vineyard plow.

Another object is to provide a vineyard plow with a hydraulic actuator and control which permits cultivating in an area closely adjacent to the vines while preventing injury to the vines.

Another object of the invention is to provide such a vineyard plow which prevents damage to the plow or other cultivating tool upon encountering an obstruction which exerts a resisting force of a predetermined value.

A further object is to provide a power actuated tool and control therefor which permits a flexibility of operation particularly with subterranean tools, such as vineyard plows and the like.

These, together with other objects, will become more fully apparent upon reference to the following description and accompanying drawings.

Figure 1:
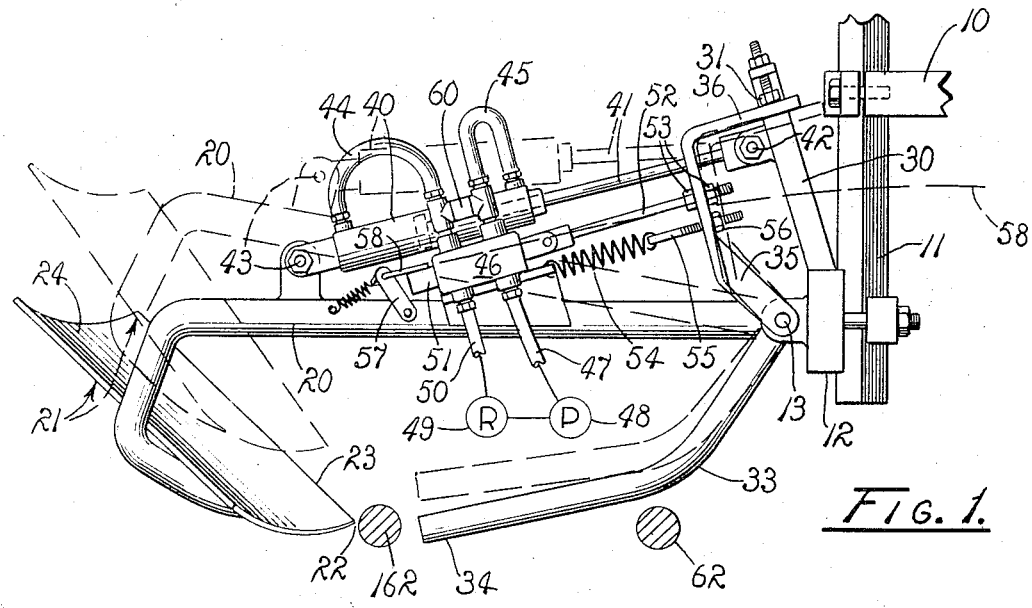
FIG. 1 is a top plan view of a vineyard plow provided with a hydraulic actuator and control system embodying the principles of the present invention, the draft linkage being shown fragmentarily and portions of the hydraulic circuit being schematically illustrated.

Referring more particularly to FIG. 1, a draft linkage is fragmentarily illustrated at 10 and adapted for connection to a suitable prime mover, such as a conventional agricultural tractor, not shown. The attachment normally includes a power lift mechanism to effect elevational positioning of the draft member. Such lift mechanisms are well known to those skilled in the art, but are not essential to the subject invention, and consequently not illustrated in the drawing. It is understood that the draft linkage 10 by means of any suitable prime mover is adapted for earth traversing movement along a predetermined path of travel closel adjacent to a row of spaced obstructions, such as grapevines, trees, and the like. Since the present invention is employed on a commercial scale in vineyard cultivation, it will be described in conjunction therewith.

The draft linkage 10 supports a transversely extended elongated tool bar fragmentarily illustrated at 11. The tool bar carries a mounting bracket 12 detachably and adjustably secured to the bar, and provides a pivot pin 13 defining a vertically disposed axis for a tool arm described below.

An elongated tool arm 20 is supported on the bracket 12 by the pivot pin for movement within a predetermined range about the axis afforded thereby. As shown in FIG. 1, the tool arm is illustrated in full lines in an extended position in a target work area, and in dashed lines retracted therefrom. As a specific illustration of a tool, a vineyard ploy 21 is rigidly secured to the distal end of the tool arm 20, and includes a forward working tip 22, a lower depending cutter edge 23 and a moldboard 24. The intended path of travel of the tool is in a direction from left to right, as viewed. Therefore, the reaction force of soil encountered by the plow 21 tends to move the plow to the extended position shown in full lines.

A rigid beam 30 is extended from the bracket 12, so as to be fixed with respect to the supporting tool bar 11, and may be considered an extension thereof. The outer end of the beam 30 is provided with an adjustable stop 31, the function of which will be discussed subsequently. A control arm 33 is mounted for rotation about the axis provided by the pivot pin 13 and includes a distal end 34 as a sensor element for obstructions above the surface of the ground and in the intended path of travel. An actuating lever 35 is non-rotatably secured, as by a tubular quill member, not shown, to the control arm 33, so as to be movable therewith. It is understood that such a tubular member is concentric with the axis provided by the pivot pin 13. The lever 35 includes an extended end 36 adapted to contact the stop 31 and thereby serve as a limiting element for the control arm.

An actuator in the form of a hydraulic cylinder 40 is provided with a piston rod 41 pivotally secured to the beam 30 by a pin 42. The cylinder end is pivotally connected to the tool arm 20 by a similar pin 43. Consequently, extension of the piston rod from the cylinder 40 moves the tool arm to an extended position, while retraction of the piston rod effects movement to the retracted position shown in dashed lines.

A pair of hoses 44, 45 are individually connected to opposite ends of the cylinder, and alternatively serve as supply and return lines during extension and retraction of the piston rod 41. For selective flow of pressure fluid to the cylinder 40, a control valve body 46 is mounted on the tool arm 20 and connected to a pressure fluid supply hose 47 leading from the output side of a pump 48, which serves as a source of pressure fluid. The intake side of the pump is connected in fluid communication with a reservoir 49, which in turn is connected to the valve body 46 by a return line 50. Appropriate relief valves and return lines can be connected to the pump if continuous operation is provided. Also, it is understood that the pump is driven by the prime mover, through a conventional power take-off shaft, not shown.

Figure 2:
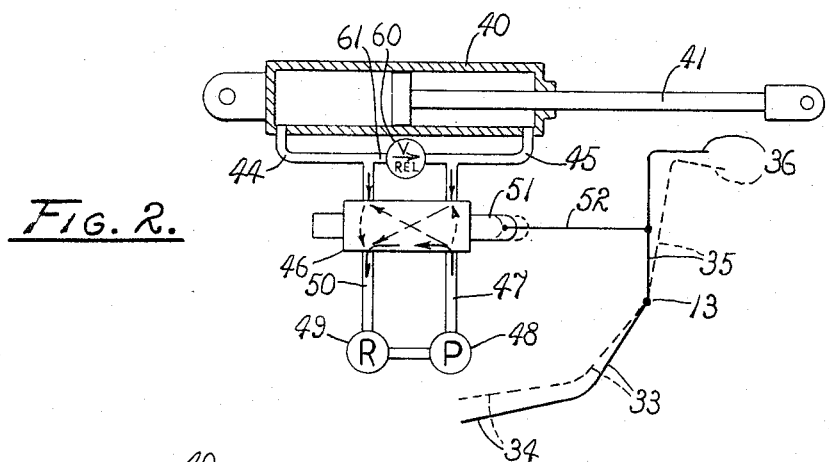
FIG. 2 is a schematic view of a fluid pressure supply and control system embodied in the first form of the invention.

The valve body 46 is provided with suitable internal porting for appropriate flow through the cylinder supply and return lines 44, 45 and the reservoir return line 50. A shiftable control element 51 is mounted in the valve body for selective control of the flow of pressure fluid through the aforementioned lines. Suitable valve bodies and control elements are commercially available and are well known to those skilled in the art of hydraulics, so that the details of the valve are not illustrated. However, the schematic flow diagram controlled by the valve in conjunction with the control element 51 is shown in FIG. 2 of the drawing.

To effect movement of the control element 51 relative to the valved body 46, a link 52 is connected to the element 51 and provided with an extended threaded end adjustably connected to the actuating lever 35 by a pair of stop nuts 53. A biasing spring 54 interconnects the valve body on the tool arm and the actuating lever 36 of the control arm 33 by means of a spring hanger 55 and an adjustable stop nut 56. A manually controlled retract arm 57 is pivotally mounted on the valve body and adapted to contact the control element 51 upon partial retrieval of an operating cable 58, fragmentarily illustrated, and leading to the operator's station normally found on commercial tractors.

A relief valve 60 is provided in the flow control circuit in fluid communication with the hose 44 connected to the extension end of the cylinder 40. A bypass line 61 provides fluid communication between the relief valve 60 and the hose 45 upon opening of the relief valve at a predetermined pressure value.

OPERATION

The operation of the described embodiment of the subject invention is believed to be readily apparent and is briefly summarized at this point. As shown in full lines in FIG. 1, the shiftable control element 51 of the valve body 46 is adjusted to a neutral position by means of the link 52 and stop nuts 53, so that flow of pressure fluid to and from the cylinder 40 is blocked when the control arm 33 is in a predetermined angular relation to the plow arm 20. Consequently, the plow arm 20 is maintained in an extended position in the work area by reason of pressure fluid being initially routed through valve body 46. This initial flow occurs as the control element is retracted to the dashed line position shown in FIG. 2, when the angular relation between the control arm and the plow arm is greater than that shown in FIG. 1. It will be noted that the biasing spring 54 at all times urges the control arm 33 toward an extended position, wherein the actuating lever 35 is in contact with the stop 31. Accordingly, the pressure fluid acting in the cylinder end of the hydraulic actuator 40 serves to maintain the plow arm in an extended position during normal operation.

In the event of an obstruction being located above the surface of the ground in the intended path of travel, the control arm 33 will contact such an obstruction during movement of the implement. The grapevine 62 is representative of such an obstruction. Upon such engagement, the control arm is first moved to the dashed line position of FIG. 1, which extends spring 54 and moves the end 36 of the actuating lever 35 away from stop 31. Concurrently, the control element 51 of the valve body 46 is moved to the dotted line position shown in FIG. 2. Immediately, pressure fluid from the pump 48 is routed through the valve body in the paths indicated by the dotted lines, so that pressure fluid is supplied through hose 45 to retract the actuator 40, while return fluid is routed from the cylinder end through hose 44, valve body 46, and return line 50 to the reservoir. This flow pattern retracts the actuator 40, and consequently retracts the plow arm 20 to the dashed line position of FIG. 1, so that the obstruction 62 is avoided by the plow 21.

Upon passing the obstruction 62, the biasing spring 54 returns the control arm 33 to the full line position of FIG. 1. This causes movement of the control element 51 to the dashed line position of FIG. 2, which is shifted to the left, as viewed. In this dashed line position, the flow pattern through the valve body is as indicated by the dashed lines, wherein pressure fluid from the pump is routed through hose 44 to extend the piston rod 41. Concurrently, return fluid flows through hose 45, valve body 46, and return line 50 to the reservoir. Upon consequent movement of the plow arm 20 to the extended position, the linkage 52 and control element 51 are again in a neutral position shown in full lines in FIG. 2. In this position, fluid flow to and from the actuator 40 is blocked, and fluid from the pump 48 is routed through valve body 46 in a closed-circuit pattern to the reservoir through return line 50, as indicated by the arrows in full lines.

Upon encountering a subterranean obstruction, such as the vine 162, an external force is applied to the forward tip 22 of the plow, which urges the plow toward a retracted position. This external force causes an increase in pressure in the cylinder end and consequently in the supply hose 44. Upon reaching a predetermined value, the relief valve 60 is opened by the rise in pressure, and permits fluid to be by-passed from the end of the cylinder through line 61 to the rod end of the cylinder through hose 45. Concurrently, the tool arm 20 is slightly deflected by the external force so as to cause relative angular movement between the fully extended control arm and the slightly retracted tool arm. Such relative angular movement shifts the valve control element 51 to a retracted position shown in dashed lines and permitting excess fluid from the cylinder end to be routed to the reservoir through the valve body 46 and return line 50. Although fluid is routed in the valve body from the pump to hose 44, which would normally cause extension of the actuator 40, the relief valve 60 is open which permits fluid to be routed through hose 45, the valve body 46, and return line 50 to the reservoir. Since the relief valve is adjusted to open at a predetermined pressure value, this additional fluid flow from the pump does not prevent the retraction of the piston within the actuator 40, and actually permits flow of fluid from the cylinder end to the rod end and concurrently returning any excess to the reservoir. Consequently, the circuit and control therefor precludes injury to the vine 162, as well as any damage to the implement in the event that a more resisting obstruction is encountered.

Upon passing the obstruction during the earth traversing movement of the plow, the external force acting upon the tip 22 is removed. The tool arm 20 is then free to return to an extended position upon closing of the relief valve 60 and continued routing of fluid to the cylinder end of actuator 40 through line 44. Pressure fluid is supplied to the cylinder end in this manner until a position of equilibrium is attained with the control element 51 in a neutral position.

SECOND FORM

Figure 3:
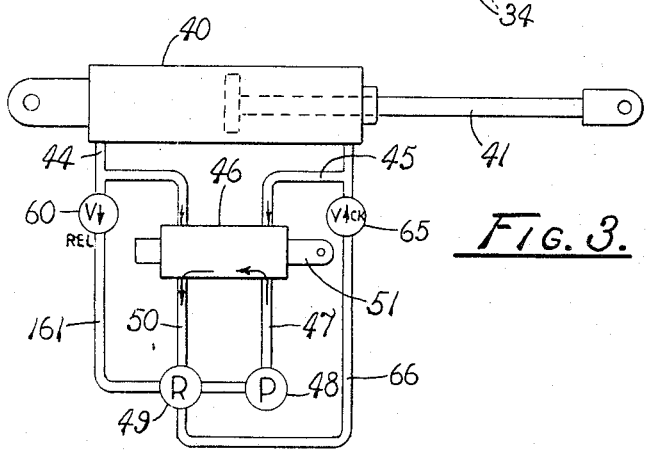
FIG. 3 is similar to FIG. 2, but shows a schematic view of a second form of the hydraulic control system adapted for use with the vineyard plow of FIG. 1.

As illustrated in FIG. 3, a second form of the invention includes the essential elements of the embodiment shown in FIGS. 1 and 2, such as the hydraulic actuator 40, control valve body 46, pump 48, reservoir 49, and relief valve 60. It will be noted that the relief valve is physically positioned in a bypass line 161 leading from the cylinder end of the actuator to the pump 48 and in fluid communication with the supply hose 44. With the circuitry of the embodiment shown in FIG. 3, make-up fluid cannot be provided to the rod end of the actuator 40 through the supply hose 44, nor is make-up fluid dependent upon the position of the control element 51 of the valve body 46. Consequently, a check valve 65 controls flow through a make-up line 66 leading from the reservoir 49.

With the actuator and control circuit therefor illustrated in FIG. 3 mounted in the vineyard plow substantially as the embodiment as shown in FIG. 1, an external force acting upon the forward tip of the plow tends to urge the plow toward a retracted position. This external force raises the pressure existing in the cylinder end of the actuator 40 in fluid communication with the relief valve 60 through hose 44. The relief valve is adjusted to a desired value to permit fluid in excess of such pressure value to be by-passed from the cylinder end to the reservoir 49 through bypass line 161. Consequently, the piston is permitted to retract within the cylinder, so that the plow moves toward a retracted position and progresses in its path of travel past the obstruction, such as the grapevine indicated at 162. During retraction of the piston rod, the control element 51 can be permitted to remain in a position blocking flow to or from either end of the actuator through hoses 44, 45, depending upon the sensitivity of the valve, the fine degree of adjustment of link 52, and magnitude of initial retraction of the plow. Therefore, any make-up oil to fill the rod end of the actuator must flow through the check valve 65, which is in fluid communication with the reservoir through make-up line 66.

Upon the plow progressing beyond the vine 162, the external force is removed which permits relief valve 60 to close so that the hydraulic control circuit resumes normal operation. With the tool arm 20 in a somewhat retracted position, an angular relation between the tool arm and the control arm 33 exists which moves the control element 51 to a fully retracted position as shown in dashed lines in FIG. 2. This is substantially the same condition as with the first form. With the control element in such a position, hydraulic fluid is routed from the pump a through the valve body 46 to supply hose 44, while return fluid is forced from the rod end of actuator 40 through hose 45, the valve body 46 and return line 50. This causes an extension of the piston rod until the plow is moved to a fully extended position and the control element is in a position of equilibrium shown in full lines with fluid flow blocked between the valve body 46 and the hoses 44, 45.

Both forms of the invention provide normal operation of the vineyard plow through the control arm 33, as is presently available in certain commercially available vineyard plows. The relief valve 60 permits a selective value for an external force to move the plow toward a retracted position. It thereby avoids injury to tender grapevines which would otherwise be destroyed, as well as precluding damage to the plow is a more resistable obstruction were encountered. The plow control circuit operates automatically and insures protection from both subterranean obstructions, as well as vines and other articles above the surface of the ground. Both forms of the invention also permit manual retraction of the plow through the retract arm 57 and control cable 58.

Although the invention has been herein shown and described in what are conceived to be the most practical and preferred embodiments, it is recognized that departures may be made therefrom within the scope of the invention, which is not to be limited to the details disclosed herein but is to be accorded the full scope of the claims so as to embrace any and all equivalent devices and apparatus.

Having described my invention, what I claim as new and desire to secure by Letters Patent is:

1. In a vineyard plow, the combination of a mobile draft member adapted for ground traversing movement along a path of travel; a plow arm; means mounting the plow arm on the draft member for pivotal movement about a vertical axis; a cultivating plow carried at one end of the arm and having a forward working tip and a moldboard formed to contact the earth during said ground traversing movement and tending to swing said arm in a predetermined direction about said axis; a source of pressure fluid; pressure fluid actuated force means carried by the draft member and operatively connected to the tool arm; conduit means connecting said force means and said source; fluid flow control means in fluid communication with said conduit means for establishing selective fluid communication between said source and said force means to effect controlled positioning of the tool arm in a predetermined range toward and away from a target work area, the controlled movement including a relatively immobilized position in said range; and auxiliary fluid control means in fluid communication with said conduit means to permit movement of the tool arm away from said target work area under the influence of an external force in opposition to said pressure fluid.

2. In a vineyard plow having a mobile draft member adapted for earth traversing movement along a predetermined path of travel, the combination of a tool arm having a depending plow member carried at one end thereof; means mounting the tool arm at the opposite end thereof for pivotal movement about a vertical axis; a hydraulic cylinder and piston assembly pivotally interconnecting the tool arm and said draft member; a source of pressure fluid; conduit means connecting said source and opposite ends of said cylinder and including control valve means for establishing selective fluid communication between said source and said ends to effect controlled extension and retraction of the cylinder and piston assembly and consequent reciprocal movement of the tool arm in predetermined range toward and away from said target work area, the controlled movement including a relatively immobilized position in said range; and relief valve means in fluid communication with at least one of said conduits connected to a respective one of the opposite ends of said cylinder to permit fluid to escape therefrom under the influence of an external force in opposition to said pressure fluid to allow movement of the tool arm away from said target work area.

3. In a vineyard plow, the combination of a mobile draft member adapted for movement along an intended path of travel; an elongated tool arm having the depending plow rigidly carried at one end thereof; means mounting the arm at the opposite end on said draft member for pivotal movement about a vertical axis toward and away from a target work area; a pressure fluid cylinder piston assembly pivotally interconnecting said draft member and said plow arm; a source of pressure fluid; conduit means interconnecting said fluid source and opposite ends of said cylinder; control valve means interposed in said conduits between said source and said cylinder for establishing selective fluid communication therebetween to effect controlled reciprocal movement of the tool arm in a predetermined range toward and away from the target work area; a control arm pivotally carried by said draft member about a substantially vertical axis so that relative angular movement is permitted between said tool arm and the control arm; resilient means interconnecting the tool arm and the control arm urging a change in the angular displacement therebetween; stop means carried by said draft member limiting the change in said angular displacement; valve operating linkage interconnecting said control arm and said control valve; adjustment means carried by said linkage so that fluid communication between said source and said cylinder is blocked by said control valve when the tool arm is extended to the work area and the control arm is in engagement with said stop, and fluid communication is established between said source and said cylinder upon a change in said angular displacement; and bypass conduit means interconnecting said opposite ends of the cylinder, including relief valve means permitting flow from one end of the cylinder to the other upon said plow being urged away from said target work area by an external force in opposition to said pressure fluid.

4. In a vineyard plow, the combination of a mobile draft member adapted for movement along an intended path of travel; an elongated tool arm having the depending plow rigidly carried at one end thereof; means mounting the arm at the opposite end on said draft member for pivotal movement about a vertical axis toward and away from a target work area; a pressure fluid cylinder piston assembly pivotally interconnecting said draft member and said plow arm; a source of pressure fluid; conduit means interconnecting said fluid source and opposite ends of said cylinder; control valve means interposed in said conduits between said source and said cylinder for establishing selective fluid communication therebetween to effect controlled reciprocal movement of the tool arm in a predetermined range toward and away from the target work area; a control arm pivotally carried by said draft member about a substantially vertical axis so that relative angular movement is permitted between said tool arm and the control arm; resilient means interconnecting the tool arm and the control arm urging a change in the angular displacement therebetween; stop means carried by said draft member limiting the change in said angular displacement; valve operating linkage interconnecting said control arm and said control valve; adjustment means carried by said linkage so that fluid communication between said source and said cylinder is blocked by said control valve when the tool arm is extended to the work area and the control arm is in engagement with said stop, and fluid communication is established between said source and said cylinder upon a change in said angular displacement; bypass conduit means connecting one end of said cylinder with said source externally of and bypassing said control valve; a relief valve in said bypass conduit permitting flow from said one end to said source upon exceeding a predetermined pressure value in said one end upon movement of the plow and tool arm under the influence of an external force; a make-up conduit connected between said source and said other end of the cylinder; and check valve means disposed in said make-up conduit preventing reverse flow from said other end to said source.

References Cited
UNITED STATES PATENTS 2,651,859  9/1953  Gralenski _____ 37—103 X
2,890,805  6/1959  Pilch _____ 172—11 X ABRAHAM G. STONE, *Primary Examiner.*

J. R. OAKS, *Assistant Examiner.*